INVENTOR
OLIVER B. CRUSE
BY
Joseph E. Papin.

May 28, 1968
O. B. CRUSE
3,385,636
COMBINED SERVICE AND AUXILIARY BRAKE WHEREIN THE AUXILIARY
BRAKE IS MANUALLY AND AUTOMATICALLY CONTROLLED
Filed June 3, 1965
2 Sheets-Sheet 2
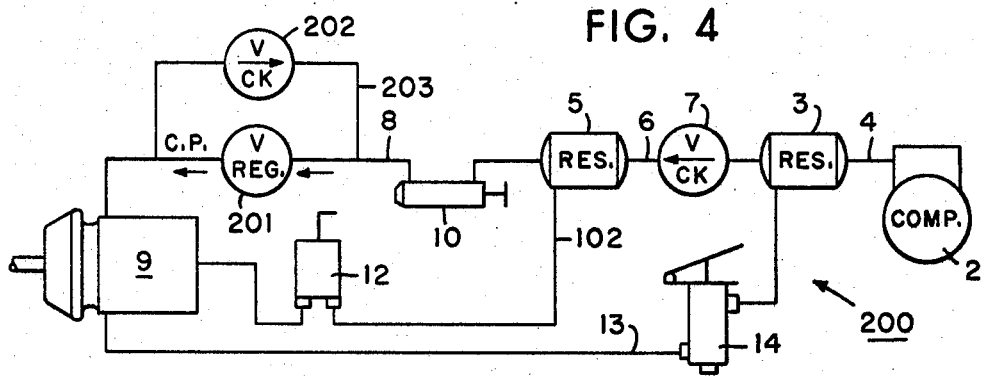
FIG. 4
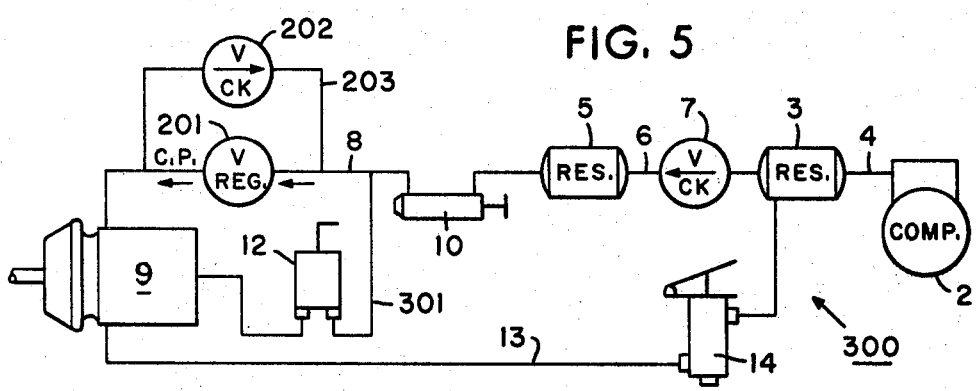
FIG. 5
FIG. 6
INVENTOR
OLIVER B. CRUSE
BY
Joseph E. Papin United States Patent Office 3,385,636
Patented May 28, 1968

3,385,636
COMBINED SERVICE AND AUXILIARY BRAKE WHEREIN THE AUXILIARY BRAKE IS MANUALLY AND AUTOMATICALLY CONTROLLED
Oliver B. Cruse, Florissant, Mo., assignor, by mesne assignments, to Wagner Electric Corporation, a corporation of Delaware
Filed June 3, 1965, Ser. No. 461,143
12 Claims. (Cl. 303—2)

ABSTRACT OF THE DISCLOSURE

A fluid pressure system having fluid pressure responsive means selectively actuated from a fluid pressure source to energize a friction device, resiliently urged means for mechanical driving engagement with said fluid pressure responsive means to effect mechanical energization of said friction device when the fluid pressure supplied to said resiliently urged means from another source is less than a predetermined value, and selectively operable means for applying fluid pressure from said other source to said resiliently urged means acting against the fluid pressure supplied thereto to drivingly engage said resiliently urged means with said fluid pressure responsive means and also effect energization of said friction device.

Figure 1:
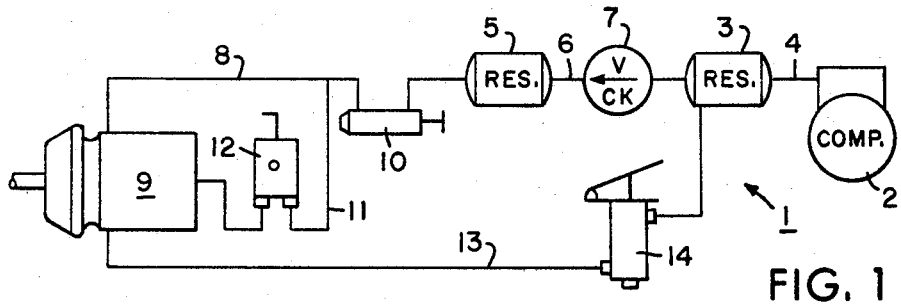

This invention relates to fluid pressure systems and in particular to means therein including a friction device operating mechanism for energizing a friction device.

In the past fluid pressure systems for controlling friction device operating mechanisms, a fluid pressure actuator was responsive to fluid pressure selectively applied thereto from a fluid pressure source to normally effect energization of a friction device associated therewith. Fluid pressure in excess of a predetermined value was normally supplied to the friction device operating mechanism acting on resiliently urged means, such as spring-loaded piston means, therein to urge said spring toward an inoperative position, and said piston means and spring were the sole means utilized to mechanically drive the fluid pressure responsive actuator for effecting mechanical or emergency energization of said friction device when the supplied fluid pressure acting on said piston means was reduced to a value less than the predetermined value. One of the undesirable or disadvantageous features of such past friction device operating mechanisms and systems therefor was that the compressive force of the spring was necessarily relatively great since the entire mechanical energization of the friction device was solely dependent thereon. Another undesirable or disadvantageous feature of the past friction device operating mechanisms and systems therefor was that the operator was unable to effect a controlled mechanical or emergency energization of the friction device which resulted in unexpected and abrupt, and therefore dangerous, stops. In other words, upon reduction of the supplied fluid pressure acting on the piston means to a value less than the predetermined value, the spring automatically effected mechanical fluid pressure energization without provision of operator control thereover. Another disadvantageous feature was that the extension of the spring upon mechanical friction device energization served to reduce the compressive force (spring rate) thereof, and such spring extension moved the piston means in the friction device operating mechanism to reduce the volume of the supplied fluid pressure acting thereon which, of course, served to increase the value of the supplied fluid pressure; therefore, in many instances, the spring-urged movement of the piston means served to increase the force of the fluid pressure acting thereon to again balance the compressive force of the spring which was reduced upon spring extension.

The principal object of the present invention is to provide a friction device operating mechanism and a fluid pressure control system therefor to overcome the aforementioned undesirable or disadvantageous features, and this and other objects and advantageous features of the present invention will become apparent hereinafter.

Briefly, the invention embodies a friction device operating system having fluid pressure responsive means for energizing friction device in response to fluid pressure selectively applied thereto from a fluid pressure source, resiliently urged means for mechanically actuating said first named means and defining opposed fluid pressure chambers, said resiliently urged means being normally urged toward an inoperative position in response to fluid pressure supplied to one of said chambers and being movable toward an operative position to mechanically actuate said first named means in response to fluid pressure selectively applied to the other of said chambers, other means normally connecting said one chamber with another fluid pressure source, and selectively operable means for selectively connecting said other chamber with said other fluid pressure source.

Figure 2:
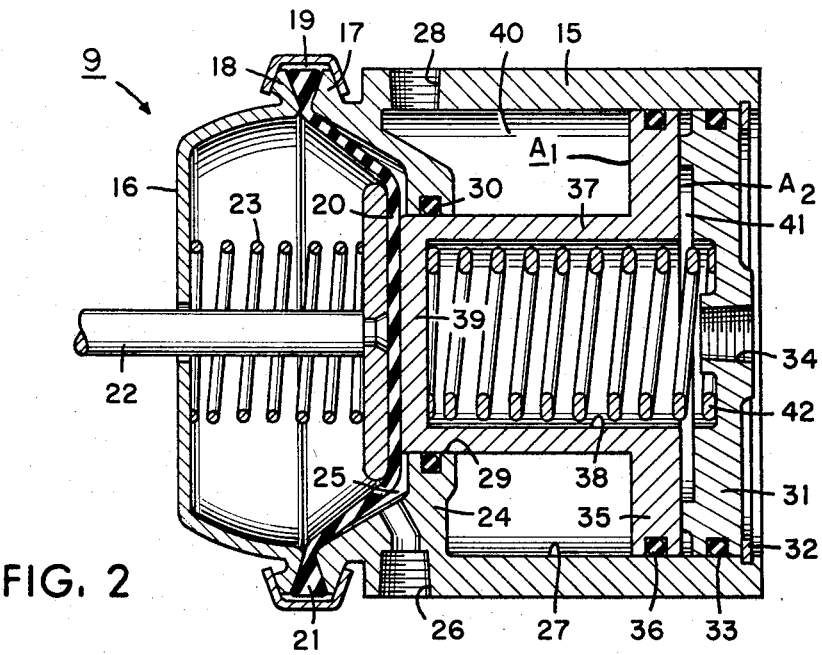

In the drawings which illustrate embodiments of the invention,

FIGS. 1, 3, 4, 5 and 6 are diagrammatic views of fluid pressure systems embodying the present invention and showing a friction device operating mechanism therein, and FIG. 2 is a sectional view showing the friction device operating mechanism of FIGS. 1, 3, 4, 5 and 6 embodying the present invention in cross-section.

Referring now to FIG. 1 in detail, a fluid pressure system, indicated generally at 1, is provided with a compressor 2 which is connected with a main or system reservoir 3 by a conduit 4, said compressor and main reservoir defining in combination a fluid pressure source. The main reservoir 3 is connected with a branch or protected reservoir or fluid pressure source 5 by a conduit 6 having a uni-directional flow or check valve 7 interposed therein, and it is apparent that the reservoir 5 is a protected reservoir since said uni-directional flow valve prevents the reduction or depletion of fluid pressure therein due to a malfunctioning compressor and/or leaks or the like in the system 1 ahead of said uni-directional flow valve. A conduit 8 is connected between the protected reservoir 5 and the emergency release port of a friction device operating mechanism or actuating cylinder 9 having a push-pull type valve 10 interposed therein. The push-pull valve 10 is of a type well known in the art being manually operable between a connecting position providing pressure fluid communication between the protected reservoir 5 and the emergency release port of the actuating cylinder 9 and a venting position interrupting said pressure fluid communication and venting the emergency release port of said actuating cylinder 9 to the atmosphere. Another conduit 11 has one end intersecting the conduit 8 between the actuating cylinder 9 and the push-pull valve 10 while the other end thereof connects with a control port of said actuating cylinder, and a modulating or metering hand valve 12, also of a type well known in the art, is interposed in the conduit 11. To complete the description of the system 1, another conduit 13 is connected between the main reservoir 3 and a service or application port in the actuating cylinder 9, and a modulating or metering application valve 14, also of a type well known in the art, is interposed in the conduit 13.

The actuating cylinder 9, FIG. 2, is provided with a housing 15 and an end plate or another housing 16 having opposed peripheral portions 17, 18 removably secured together by a clamping band 19, and a diaphragm or fluid pressure responsive actuator 20 is provided with a peripheral bead 21 clamped in sealing engagement between the opposed peripheral portions 17, 18 of said housings 15, 16. A push rod 22 extends through an aperture 23 in the housing 16 having an exterior end operatively connected with a friction device (not shown) and the interior end thereof urged into engagement with the diaphragm 20 by a return spring 23. The housing 15 is provided with a radially extending wall 24 defining with the diaphragm 20 an expansible fluid pressure service or application chamber 25, and a service or application port 26 which receives the conduit 13, as previously mentioned, is provided in said housing in pressure fluid communication with said application chamber. The wall 24 also defines the leftward end of an axial bore 27 provided in the housing 15, and an emergency release port 28 which receives the conduit 13, as previously mentioned, is also provided in said housing intersecting with said housing bore adjacent to said wall. Another bore 29 having a seal 30 disposed therein is provided through the wall 24 between the application chamber 25 and the leftward end of the housing bore 27. A bore closure member 31 which defines the rightward end of the housing bore 27 is retained against displacement therefrom by a snap ring and groove assembly 32 provided in said housing bore adjacent the rightward end thereof, said closure member being provided with a peripheral seal 33 in sealing engagement with said housing bore. A control port 34 which receives the conduit 11, as previously mentioned, is provided through the closure member 31 connecting with the housing bore 27.

A piston member 35 is slidable in the housing bore 27 between the wall 24 and the closure member 31 and carries a peripheral seal 36 in sealing engagement with said housing bore. The piston member 35 is provided with an integral extension 37 which is slidably disposed in the wall bore 29 in sealing engagement with the seal 30 thereof, and a blind bore 38 is also provided through the rightward end of said piston member and extension defining an integral working or abutment end wall 39 on the leftward end of said extension which is disposed in the application chamber 25 for driving engagement with the diaphragm 20. An expansible fluid pressure emergency chamber 40 is defined in the housing bore between the wall 24 and the piston member 35 in pressure fluid communication with the emergency port 28, and an expansible fluid pressure control chamber 41 is defined in said housing bore in opposition to said emergency chamber between said piston member and the closure member 31, said control chamber being in pressure fluid communication with the control port 34. It is apparent that the effective fluid pressure responsive area $A_1$ of the piston member 35 and extension 37 in the emergency chamber 41 is predeterminately less than the effective fluid pressure responsive area $A_2$ of said piston member and extension in the control chamber 40. To complete the description of the actuating cylinder 9, an emergency or parking spring 42 is coaxially provided in the blind bore 38 and biased between the extension end wall 39 and the closure member 31, the piston member 35, extension 39 and said spring providing resiliently urged means opposing fluid pressure expansion of the emergency chamber 40.

Under normal operating conditions with the hand valve 12 positioned to vent the control chamber 41 of the actuating cylinder 9 to atmosphere through the control port 34, the conduit 11 and said hand valve, pressure fluid flows from the compressor 2 through the conduit 4 to the main reservoir 3 and therefrom through the conduit 6 and check valve 7 into the protected reservoir 5; and assuming the push-pull valve 10 to be in the connecting position thereof, pressure fluid also flows from said protected reservoir through the conduit 8, said push-pull valve, and the emergency port 28 of said actuating cylinder into the emergency chamber 40. With the control chamber 41 vented to the atmosphere, the fluid pressure so transmitted to the emergency chamber 40 acts on the effective piston area $A_1$ therein to establish a force $F_1$ urging the piston 35 toward an inoperative or non-working position in abutment with the closure member 35 against the compressive force $Fc$ of the emergency spring 42. Normal operating conditions are effected with the component parts of the system 1 and the actuating cylinder 9 positioned as described above and as shown in FIGS. 1 and 2, and the friction device (not shown) associated therewith is de-energized.

If the operator desires to effect energization of the friction device for deceleration purposes or a complete stop under normal operating conditions, an operator applied force on the application valve 14 meters fluid pressure from the main reservoir 3 through the conduit 13, said application valve and the service port 26 of the actuating cylinder 9 into the service chamber 25, and the fluid pressure so established in said service chamber acts on the effective area of the diaphragm 20 to create a service force $Fs$ which moves said diaphragm and the push rod 22 leftwardly in a working or friction device energizing direction against the return spring 23. When the desired rate of deceleration or the complete stop is attained, the operator applied force is removed from the application valve 14 to vent the fluid pressure in the service chamber 25 to atmosphere through the service port 26, the conduit 13 and said application valve; therefore, the service force $Fs$ is eliminated, and the return spring 23 urges the push rod 22 and the diaphragm 20 rightwardly in a non-working or friction device de-energizing direction toward their normal operating positions.

Under emergency operating conditions in the event of fluid pressure loss from the main reservoir 3 due to a malfunctioning compressor and/or leaks in the system 1 ahead of the check valve 7 or in the event of a reduction of fluid pressure in said main reservoir to a level seriously impairing the effectiveness of the above-described service braking application, the operator may actuate the hand valve 12 to meter fluid pressure from the protected reservoir 5 through the conduit 8, the push-pull valve 10, the conduit 11 and the control port 34 of the actuating cylinder into the control chamber 41. The fluid pressure so metered to the control chamber 41 acts on the effective piston area $A_2$ to create a control force $F_2$ additive to the spring force $Fc$ and in opposition to the force $F_1$. The additive forces $Fc$ and $F_2$ in opposition to the force $F_1$ serve to controllably move the piston 35 leftwardly in the housing bore 27 in a working or friction device energizing direction toward engagement with the housing wall 24, and the piston extension 37 is movable therewith to mechanically drive the diaphragm 20 and push rod 22 leftwardly in a friction device energizing direction. Of course, as the spring 42 is extended to mechanically drive the piston 35 the force $Fc$ is lessened due to the inherent spring rate thereof, and it may be necessary to increase the fluid pressure metered into the control chamber 41 thereby increasing the force $F_2$ to compensate for the decrease of the spring force $Fc$ upon the extension of said spring. In this manner, controlled vehicle deceleration or a complete stop is effected under emergency operating conditions by metering fluid pressure from the protected reservoir 5 into the control chamber 41, and it is also apparent that the fluid pressure in said protected reservoir can be "dumped" or fully metered into the control chamber 41 to obtain a maximum force $F_2$. Upon the attainment of the desired rate of deceleration or the complete stop, the hand valve 12 may thereafter be moved to the venting position thereof to exhaust the fluid pressure from the control chamber 41 through the control port 34, the conduit 11 and said hand valve to the atmosphere to eliminate the force $F_2$ wherein the force $F_1$ again overcomes the spring force $Fc$ to provide for movement of the piston 35 and component parts associated therewith to their inoperative positions. In this manner, the vehicle can be moved to a safe position with respect to the roadway and other vehicles for repair of the leaks or the like in the system 1 causing the emergency operating condition.

The operator may also "dynamite" the system 1 to effect or simulate emergency operating conditions or for vehicle parking purposes under normal operating conditions. To "dynamite" the system 1, the operator moves the push-pull valve 10 to the venting position thereof interrupting pressure fluid communication of the actuating cylinder emergency chamber 40 and the hand valve 12 with the protected reservoir 5 and exhausting said chamber 40 and hand valve 12 to the atmosphere through the conduits 8 and 11 and said push-pull valve. Exhaustion of the fluid pressure from the chamber 40 eliminates the force $F_1$ and permits the spring force $Fc$ to urge the piston 35 and extension 37 leftwardly to mechanically drive the diaphragm 20 and push rod 22 in the friction device energizing direction, as previously described. In this manner, only the compressive force $Fc$ of the spring 42 is utilized to effect energization of the friction device associated with the actuating cylinder 9, and the hand valve 12 is vented to obviate the establishment of the force $F_2$ which, when unopposed by the force $F_1$, could compound with the spring force $Fc$ to effect bending, fracture or other undesirable affects on the component parts of the actuating cylinder 9 and the friction device associated therewith. It should also be noted that any applied fluid pressure in the service chamber 25 acts on the effective area of the extension end wall 39 therein to establish a force opposing the spring force $Fc$ to also limit the extent compounding of the spring force $Fc$ and the service force $Fs$.

Figure 3:
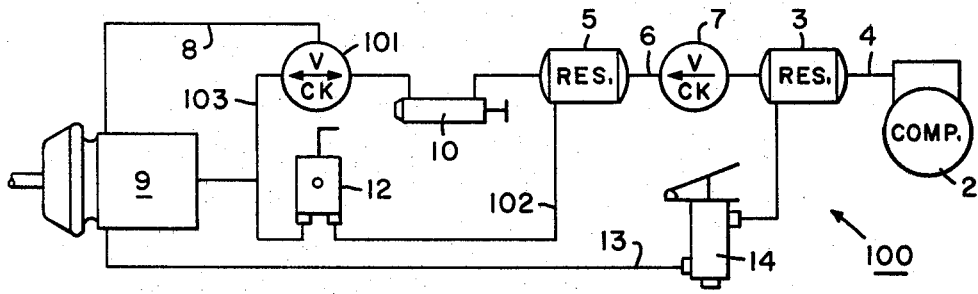

Referring now to FIG. 3 in detail, a fluid pressure system 100 is shown having substantially the same component parts and functioning in substantially the same manner as the previously described system 1 with the following exceptions.

The system 100 is provided with a two-way check valve 101 having its outlet side and one of its inlet sides connected in the conduit 8 between the emergency port 28 of the actuating cylinder 9 and the push-pull valve 10, and the hand valve 12 is interposed in a conduit 102 which is connected between the protected reservoir 5 and the control port 34 of the actuating cylinder 9. To complete the description of the system 100, another conduit 103 has one end connecting with the other inlet side of the two-way check valve 101 and the other end thereof intersecting with the conduit 102 between the actuating cylinder control port 34 and the outlet side of the hand valve 12.

Under normal operating conditions, the two-way check valve 101 provides open pressure fluid communication through the conduit 8 between the protected reservoir 5 and the actuating cylinder chamber 40 when the push-pull valve 10 is in the connecting position thereof, and said communication between the conduit 8 and the conduit two-way check valve also serves to interrupt pressure fluid communication between the conduit 8 and the conduit 103. In this manner, the force $F_1$ of the fluid pressure so established in the chamber 40 and acting on the effective piston area $A_1$ serves to move the piston 35 against the compressive force $Fc$ of the spring 42 toward the inoperative position thereof in engagement with the housing closure member 31, and the application valve 14 may be manually operated to actuate the diaphragm 20 and push rod 22 and effect a normal service braking effort to energize the friction device, as previously described.

Under emergency operating conditions, the hand valve 12 is actuated to meter fluid pressure from the protected reservoir 5 through the conduit 102, said hand valve and the control port 34 of the actuating cylinder 9 into the control chamber 41. The fluid pressure so established in the control chamber 41 acts on the effective piston area $A_2$ to create the force $F_2$ which is additive to the spring force $Fc$ and opposing the force $F_1$, and as previously described, the establishment of the force $F_2$ serves to controllably move the piston 35, the extension 37, and the diaphragm 20 and push rod 22 leftwardly in the friction device energizing direction to effect controlled friction device energization along with controlled vehicle deceleration or complete stop under emergency operating conditions. Since the metered fluid pressure from the hand valve 12 transmitted through the conduit 103 to the two-way check valve 101 can never exceed the fluid pressure supplied to said two-way check valve from the protected reservoir 5, said two-way check valve will continue to interrupt pressure fluid communication between the conduits 8 and 103 except under "dynamiting" conditions described hereinafter.

The operator may also "dynamite" the system 100 to effect or simulate emergency operating conditions or for vehicle parking purposes under normal operating conditions. To "dynamite" the system 100, the operator moves the push-pull valve to the venting position thereof which serves to exhaust fluid pressure from the actuating cylinder chamber 40 through the emergency port 28, the conduit 8, the two-way check valve 101 and said push-pull valve to the atmosphere thereby eliminating the force $F_1$. Upon elimination of the force $F_1$, the opposing compressive force $Fc$ of the spring 42 mechanically drives the piston 35, diaphragm 20 and push rod 22 leftwardly in the friction device energizing direction to effect uncontrolled emergency energization of the friction device associated therewith. The operator may subsequently actuate the hand valve 12 to meter fluid pressure from the protected reservoir 5 to the actuating cylinder control chamber 41 through the conduit 102 to re-establish the force $F_2$ which is additive to the spring force $Fc$ to increase the intensity of the emergency friction device energization; however, compounding of the forces $Fc$ and $F_2$ is opposed by the simultaneous re-establishment of the opposing force $F_1$ as described hereinbelow. In other words, the two-way check valve 101 is actuated in response to fluid pressure metered thereto through the conduit 103 from the hand valve 12 to its other position interrupting pressure fluid communication through the conduit 8 between the push-pull valve 10 and the emergency chamber 40 and establishing open pressure fluid communication between the conduit 103 and said emergency chamber through the conduit 8. In this manner, the fluid pressure metered from the hand valve 12 to the emergency and control chambers 40, 41 acts on the effective piston areas $A_1$, $A_2$ therein to establish opposing differential forces $F_1$, $F_2$ thereby obviating full compounding of the additive forces $Fc$ and $F_2$. Of course, under normal operating conditions, the system 100 may be "dynamited" for vehicle parking purposes, and the hand valve 12 may be actuated to assist the spring force $Fc$, as described above.

When the cause of the emergency operating conditions has been repaired and normal operating conditions re-established, the hand valve 12 may be moved to the venting position thereof to simultaneously exhaust fluid pressure from the control chamber 41 through the control port 34, the conduit 102 and said hand valve and from the emergency chamber 40 through the emergency port 28, the conduit 8, the two-way check valve 101 and the conduit 103 thereby eliminating the opposing differential forces $F_1$, $F_2$ effected by metered fluid pressure from said hand valve. When the push-pull valve 10 is returned to its connecting position, fluid pressure from the protected reservoir again actuates the two-way check valve 101 to its normal operating position effecting pressure fluid communication between said protected reservoir and the emergency chamber 40 through the conduit 8 thereby re-establishing the force $F_1$ to urge the piston 35 to its inoperative position against the compressive force $Fc$ of the spring 42.

Referring now to FIG. 4 in detail, a fluid pressure system 200 is shown having substantially the same component parts and functioning in substantially the same manner as the previously described fluid pressure systems 1, 100 with the following exceptions.

The fluid pressure system 200 is provided with a pressure regulating valve 201 interposed in the conduit 8 with the inlet side thereof in pressure fluid communication with the push-pull valve 10 and the outlet side thereof in pressure fluid communication with the emergency port 28 of the actuating cylinder 9. The pressure regulating valve 201 is of the type well known to the art providing a relatively constant fluid pressure at the outlet side thereof in response to a variable fluid pressure supplied to the inlet side thereof. To complete the description of the system 200, a by-pass uni-directional flow or check valve 202 is provided in shunt relation with the pressure regulating valve 201 being interposed in a by-pass or shunt conduit 203 which has opposed ends respectively intersecting with the conduit 8 adjacent the opposed inlet and outlet sides of said pressure regulating valve.

Under normal operating conditions with the push-pull valve 10 in the connecting position thereof and the hand valve 12 in the venting position thereof, the pressure regulating valve 201 is responsive to fluid pressure supplied to the inlet side thereof from the protected reservoir through the conduit 8 and said push-pull valve to provide a fluid pressure at the outlet side thereof having a predetermined substantially constant value $Pc$ which is transmitted through the conduit 8 and the emergency port 28 of the actuating cylinder 9 into the chamber 40. The fluid pressure $Pc$ so established in the chamber 40 acts on the effective piston area $A_1$ to create a force $Fp$ having a predetermined magnitude just great enough to move the piston 35 toward the inoperative position thereof against the compressive force $Fc$ of the spring 42. In other words, the predetermined magnitude of the force $Fp$ is just great enough to balance the spring force $Fc$ at that specific deflection of the spring 42 when the piston 35 is in the inoperative position, and with the piston 35 in its inoperative position, the application valve 14 may be manually operated to effect fluid pressure actuation of the diaphragm 20 and push rod 22 for a normal service braking effort to energize the friction device, as previously mentioned.

Under emergency operating conditions, the hand valve 12 is actuated to meter fluid pressure from the protected reservoir 5 through the conduit 102, said hand valve and the control port 34 of the actuating cylinder 9 into the control chamber 41. The fluid pressure so established in the chamber 41 acts on the effective piston area $A_2$ to create the force $F_2$ which is additive to the spring force $Fc$ and in opposition to the force $Fp$, and as previously described the establishment of the force $F_2$ serves to controllably move the piston 35, the extension 37, and the diaphragm 20 and push rod 22 leftwardly in the friction device energizing direction to effect controlled friction device energization along with the resulting controlled vehicle deceleration or a complete stop under emergency operating conditions. The leftward movement of the piston 35 in the housing bore 27 serves to decrease the volume of the chamber 40 and thereby appreciably increases the magnitude of the fluid pressure. $Pc$; however, the by-pass check valve 202 is responsive to increases in the fluid pressure $Pc$ above the magnitude of the fluid pressure in the protected reservoir through the by-pass conduit 203. In this manner, the by-pass check valve 202 not only serves to reduce the increased fluid pressure $Pc$, which is coincidental with the volumeric reduction of chamber 40, in order to reduce the force $Fp$ opposing the spring force $Fc$, which is also reduced upon expansion of the spring 42 from the predetermined deflection thereof, but also serves to replenish the fluid pressure supply in the protected reservoir 5 in order to obviate the necessity of supplying make-up fluid pressure thereto from the main reservoir 5.

When the desired rate of deceleration or the complete stop is attained, the operator de-actuates the hand valve 12 to exhaust fluid pressure from the control chamber 41 through the control port 34 and the conduit 102 and said hand valve to the atmosphere thereby eliminating the force $F_2$. Upon elimination of the force $F_2$, the force $Fp$ serves to move the piston 35 rightwardly toward the balanced or inoperative position thereof against the spring force $Fc$ thereby effecting expansion of the chamber 40 to its original volume, and the pressure regulating valve 201 meters fluid pressure from the protected reservoir 5 into the chamber 40, as previously described, to increase the fluid pressure $Pc$ to its predetermined value, if necessary. When the fluid pressure $Pc$ re-attains its predetermined value, the force $Fp$ once again balances the spring force $Fc$ to maintain the piston 35 in its inoperative position.

The system 200 may also be "dynamited" to effect or simulate emergency operating conditions or for vehicle parking purposes. To "dynamite" the system 200, the operator moves the push-pull valve 10 to the venting position thereof interrupting pressure fluid communication between the reservoir 5 and both the inlet side of the pressure regulating valve 201 and the outlet side of the by-pass check valve 202, and in this manner, the fluid pressure $Pc$ in the actuating cylinder chamber 40 is exhausted through the emergency port 28, the conduit 8, the by-pass check valve and conduit 202, 203 and said push-pull valve to the atmosphere thereby eliminating the force $Fp$. Upon elimination of the force $Fp$, the spring force $Fc$ is effective to mechanically move the piston 35 and the diaphragm 20 and push rod 22 leftwardly in the friction device energizing direction under such simulated emergency operating conditions. In the event a greater force is needed to effect vehicle deceleration or a complete stop when the system 200 is "dynamited," the hand valve 12 may be actuated to meter fluid pressure from the protected reservoir 5 into the control chamber 41 to establish the force $F_2$ which is additive to the spring force $Fc$ for effecting controlled friction device energization under the simulated emergency operating conditions.

Referring now to FIG. 5 in detail, another fluid pressure system 300 is shown having substantially the same component parts and functioning in substantially the same manner as the previously described fluid pressure system 200 with the following exceptions.

In the fluid pressure system 300, the hand valve 12 is interposed in a conduit 301 which has one end connected with the control port 34 of the actuating cylinder 9 and the other end thereof intersects with the conduit 8 between the inlet side of the pressure regulating valve 201 and the push-pull valve 10. When the system 300 is "dynamited," the hand valve 12 is also disabled since the portion of the conduit 301 connected to the inlet side of said hand valve is also vented to atmosphere through the push-pull valve 10. Disabling the hand valve 12 obviates the establishment of the force $F_2$ to prevent the compounding thereof with the spring force $Fc$ which is the sole force effecting friction device energization upon "dynamiting" of the system 300.

Referring now to FIG. 6, a fluid pressure system 400 is shown having substantially the same component parts and functioning in substantially the same manner as the previously described fluid pressure system 200 with the following exceptions.

The fluid pressure system 400 is provided with a pressure relief valve 401 of the type well known to the art which is connected with the conduit 8 adjacent to the outlet side of the pressure regulating valve 201 by another conduit 402, and a push-pull valve 410 of the type well known to the art and functioning in the same manner as the previously described push-pull valve 10 is interposed in the conduit 8 between the actuating cylinder emergency port 28 and the outlet side of the pressure regulating valve 201. With the push-pull valve 410 in the connection position thereof, providing pressure fluid communication between the pressure regulating valve 201 and the emergency port 28, the pressure relief valve 401 is responsive to bleed-off or exhaust fluid pressure in excess of the predetermined magnitude of the fluid pressure Pc at the outside of the pressure regulating valve 201 in order to maintain the fluid pressure Pc of the pressure regulating valve 201 at its predetermined value; therefore, it is apparent that fluid pressure increases occasioned upon the volumetric reduction of the actuating cylinder chamber 40 and will be exhausted by the pressure relief valve 401 which serves to maintain the force Fp at its predetermined magnitude in opposition to the compounding of the forces Fc and $F_2$.

The system 400 may also be "dynamited" to effect or simulate emergency operating conditions or for parking purposes under normal operating conditions. To "dynamite" the system 400, the push-pull valve 410 is manually moved to the venting position thereof interrupting pressure field communication between the actuating cylinder chamber 40 and the pressure regulating valve 201 and pressure relief valve 401 and exhausting said chamber 40 through the conduit 8 and said push-pull valve to the atmosphere. The exhaustion of the chamber 40 eliminates the force Fp thereby permitting the force Fc of the spring 42 to mechanically move the piston 35 and the diaphragm 20 and push rod 22 leftwardly in the friction device energizing direction to effect vehicle deceleration or a complete stop under such simulated emergency operating conditions. In the event a greater force is necessary to effect the vehicle deceleration or complete stop when the system 400 is "dynamited," the hand valve 12 may be actuated to meter pressure fluid from the protected reservoir 5 into the control chamber 41 to establish the force $F_2$ which is additive to the spring force Fc for effecting controlled friction device energization under such simulated emergency operating conditions.

From the foregoing, it is apparent that novel friction device operating systems 1, 100, 200, 300 and 400 are provided meeting the objects and advantages set out hereinbefore, as well as other objects and advantages, and that changes or modifications as to the precise connections, configurations, shapes and details of the constructions set forth in the disclosure by way of illustration may be made by those skilled in the art without departing from the spirit of the invention, as defined by the claims which follow.

The embodiments of an invention in which an exclusive property or privilege is claimed are defined as follows:

1. A fluid pressure system for controlling the energization of a friction device comprising a pair of fluid pressure sources, means for connecting one of said sources in only fluid pressure flow receiving relation with the other of said sources, actuating means for said friction device including means responsive to fluid pressure selectively applied thereto from said other source to normally energize said friction device, resiliently urged means movable in said actuating means between an inoperative position and an operative position for driving engagement with said included means and defining with said actuating means a pair of opposed expansible fluid pressure chambers, said resiliently urged means having an effective area in one of said chambers greater than another opposing effective area thereon in the other of said chambers, other means for supplying fluid pressure between said one source and said other chamber acting on said other area to normally urge said resiliently urged means toward the inoperative position thereof, and selectively operable means normally venting said one chamber to the atmosphere and selectively operable to apply fluid pressure between said one source and said one chamber acting on said first named area in opposition to the fluid pressure in said other chamber acting on said other opposing area to move said resiliently urged means toward its operative position into driving engagement with said included means to also effect energization of said friction device.

2. The fluid pressure system according to claim 1 comprising other selectively operable means movable between one position connecting said one source in pressure fluid communication with said other chamber and first named selectively operable means and another position interrupting pressure fluid communication of said one source with said other chamber and first named selectively operable means and venting said first named selectively operable means and said other chamber to the atmosphere, said resiliently urged means being movable from its inoperative position toward its operative position to effect the driving engagement thereof with said actuating means and energize said friction device upon movement of said other selectively operable means to the other position thereof.

3. The fluid pressure system according to claim 1 comprising other selectively operable means connected between said one source and other chamber and movable toward a venting position venting said other chamber to the atmosphere, and a two-way check valve connecting said other chamber with said other selectively operable means or with said first named selectively operable means, said resiliently urged means being movable to drivingly engage said actuating means and effect mechanical energization of said friction device upon movement of said other selectively operable means to the venting position thereof when said first named selectively operable means is venting said one chamber to the atmosphere.

4. The fluid pressure system according to claim 3 wherein said two-way check valve is responsive to fluid pressure applied by said first named selectively operable means to said one chamber to connect said one chamber in pressure fluid communication with said other chamber when said other selectively operable means is in the venting position thereof and said first named and other opposing areas being respectively responsive to the fluid pressure applied to said one and other chambers by said first named selectively operable means to establish a differential force for moving said resiliently urged means and effecting the driving engagement thereof with said actuating means to energize said friction device.

5. The fluid pressure system according to claim 1, wherein said other means includes a fluid pressure regulating means for maintaining the fluid pressure supplied to said other chamber at a substantially constant value, the fluid pressure supplied in said other chamber acting on said other opposing area of said resiliently urged means to establish an opposing force substantially balancing the force of said resiliently urged means in its inoperative position and the fluid pressure applied in said one chamber by said first named selectively operable means acting on said first named area of said resiliently urged means to establish a control force supplemental to the force of said resiliently urged means to effect movement thereof against said opposing force to drivingly actuate said included means and effect energization of said friction device independently of the fluid pressure applied to said included means.

6. The fluid pressure system according to claim 5, wherein said other means also includes means connected in by-pass relation with said fluid pressure regulating means between said other chamber and said one source for limiting fluid pressure increase in said other chamber in excess of the substantially constant value upon contraction of said one chamber in response to the control force movement of said resiliently urged means, said last named means providing passage for increased fluid pressure from said other chamber to said one source when the value of said increased fluid pressure exceeds that of the fluid pressure at said source.

7. The fluid pressure system according to claim 6, wherein said other means also includes other selectively operable means connected between said fluid pressure regulating means and last named means and said one source and movable between one position connecting said fluid pressure regulating means and last named means in pressure fluid communication with said one source and another position interrupting pressure fluid communication between said fluid pressure regulating means and last named means and said one source and venting said last named means to the atmosphere, the force of said resiliently urged means serving to drivingly actuate said actuating means and effect mechanical energization of said friction device when said other selectively operable means is in the other position thereof.

8. The fluid pressure system according to claim 5, wherein said other means also includes means connected between said fluid pressure regulating means and said other chamber for predeterminately limiting fluid pressure increase in excess of the substantially constant value thereof in said other chamber upon the contraction thereof in response to friction device energization movement of said resiliently urged means.

9. The fluid pressure system according to claim 5, wherein said other means also includes means connected between said fluid pressure regulating means and said other chamber for exhausting fluid pressure in excess of another value predeterminately greater than the substantially constant value from said other chamber upon the contraction thereof in response to friction device energization movement of said resiliently urged means.

10. The fluid pressure system according to claim 8, wherein said other means also includes other selectively operable means connected between said last named means and said other chamber and movable between one position providing pressure fluid communication between said other chamber and said pressure regulating means and another position interrupting said pressure fluid communication and venting said other chamber to the atmosphere, said resiliently urged means being movable to drivingly engage said actuating means and effect friction device energization when said other selectively operable means is in the other position thereof.

11. A fluid pressure system for controlling the energization of a friction device comprising a main source of fluid pressure, another source of fluid pressure, means for connecting said other fluid pressure source in only fluid pressure flow receiving relation with said main source, actuating means for said friction device including means responsive to fluid pressure selectively applied thereto from said main source to normally energize said friction device, a pair of opposed expansible fluid pressure chambers in said actuating means, resiliently urged means movable in said actuating means between said chambers and opposing fluid pressure expansion of one of said chambers and having a working end extending exteriorly of said one chamber for mechanical driving engagement with said included means, and a first effective area on said resiliently urged means in the other of said chambers greater than a second effective area on said resiliently urged means in said one chamber and opposed to said first area means for supplying fluid pressure from said other source to said one chamber acting on said second area to establish a first force normally urging said resiliently urged means toward a position in said actuating means obviating the mechanical driving engagement between said working end and said included means, and selectively operable means for applying fluid pressure from said other source to said other chamber acting on said first area to establish a second force in opposition to said first force and additive to the force of said resiliently urged means to move said resiliently urged means toward another position in said actuating means effecting the driving engagement of said working end with said included means to energize said friction device independently of the fluid pressure applied to said first named means.

12. A fluid pressure system for controlling the energization of a friction device comprising a pair of fluid pressure sources, means connected between said sources including means providing only uni-directional pressure fluid flow from one of said sources to the other thereof, a friction device operating mechanism including a housing, fluid pressure responsive actuating means for operative connection with said friction device movable in said housing and defining therewith an expansible actuating chamber, selectively operable metering means for metering fluid pressure from said one source to said actuating chamber, said actuating means being movable in response to fluid pressure in said actuating chamber to normally energize said friction device, opposed expansible fluid pressure control and emergency chambers in said housing, resiliently urged means movable in said housing between said control and emergency chambers and having a compressive force opposing fluid pressure expansion of said emergency chamber including a portion extending into said actuating chamber for driving engagement with said actuating means, said resiliently urged means having one effective fluid pressure responsive area in said control chamber greater than another opposed effective fluid pressure responsive area in said emergency chamber, means for supplying fluid pressure from said other source to said emergency chamber, said resiliently urged means being movable against the compressive force thereof toward a position in said housing preventing driving engagement thereof with said actuating means in response to an opposing force established by the fluid pressure in said emergency chamber acting on said other effective area, and other selectively operable metering means for metering fluid pressure from said other source to said control chamber, said resiliently urged means being movable against said opposing force to effect the driving engagement with said actuating means and drive said actuating means independently of the fluid pressure applied thereto to energize said friction device in response to a control force established by the fluid pressure in said control chamber acting on said one effective area of said resiliently urged means and supplemental to the compressive force thereof.

References Cited

UNITED STATES PATENTS

| 1,548,394 | 8/1925 | Sumner | 303—71 |
| 2,586,442 | 2/1952 | Seagren | 91—165 X |
| 3,090,359 | 5/1963 | Hoppenstand | 303—6 |
| 3,163,092 | 12/1964 | Masser | 303—6 |

EUGENE G. BOTZ, *Primary Examiner.*